United States Patent [19]
Bilz et al.

[11] 3,816,015
[45] June 11, 1974

[54] QUICK-CHANGE CHUCK

[75] Inventors: Otto Bilz, Esslingen; Otto Fauth, Nellingen, both of Germany

[73] Assignee: Firma Otto Bilz Werkzeugfabrik, Nellingen, Germany

[22] Filed: Jan. 11, 1972

[21] Appl. No.: 217,065

[30] Foreign Application Priority Data
Jan. 15, 1971 Germany............................ 2101679

[52] U.S. Cl....................... 408/6, 408/238, 279/75, 279/82
[51] Int. Cl....................... B23b 31/22, B23b 49/00
[58] Field of Search............ 279/1 B, 82, 75, 30, 22; 408/239, 6, 16, 238

[56] References Cited
UNITED STATES PATENTS
3,587,361  6/1971  Smith.................................. 408/16
3,723,017  3/1973  Bilz et al............................. 408/238

FOREIGN PATENTS OR APPLICATIONS
1,166,128  10/1969  Great Britain...................... 279/1 B

*Primary Examiner*—Gil Weidenfeld
*Attorney, Agent, or Firm*—Craig & Antonelli

[57] ABSTRACT

A quick change chuck of the type which by the manipulation of an outer control sleeve, a tool-holding collet may be quickly mounted in or removed from a tubular spindle head. The outer end of the collet carries a nut which has an annular groove into which locking balls may engage which are slidable in radial bores in a ball-holding sleeve which is mounted on the outer surface of the spindle head. By sliding the outer control sleeve back or forth along this ball-holding sleeve, the balls will either be pressed partly into the groove in the nut so as to connect the nut and the ball-holding sleeve to each other or the balls will be radially released from the nut and pass partly into an inner recess in the control sleeve. The ball-holding sleeve is also slidable for a limited distance along the spindle head against the action of a spring from a forward idling position to a rear working position of this sleeve and also of the collet. The ball-holding sleeve and the collet remain in the idling position, for example, when the machine is stopped or when the collet carries no tool or a broken tool, and they are shifted to the working position by the cutting pressure of the tool upon a workpiece. One or the other of these positions may be indicated by a measuring instrument, for example, an electronic switch or a countertube, the actuation of which may also be used for controlling the operation of the machine.

10 Claims, 4 Drawing Figures

QUICK-CHANGE CHUCK

The present invention relates to a quick-change chuck of the type in which the front end of a tool-holding collet which may be inserted into a spindle head so as to be nonrotatable therein carries a nut which is provided with a peripheral groove into which locking balls may engage which are radially slidable in bores in a ball-holding sleeve which is mounted on the outer surface of the spindle head. By sliding the outer control sleeve back or forth along the ball-holding sleeve, the balls will either be pressed partly into the groove in the nut so as to connect the nut and the ball-holding sleeve to each other or the balls will be radially released from the nut and pass partly into an inner recess in the control sleeve.

Especially for drilling machines with multiple spindles but also for other drilling machines it is important to be able to check whether there might be a spindle which is incapable of producing a bore in a workpiece, for example, because the drill has broken off. This checking is usually carried out by special devices by means of contact pins which test the depth of the bores. Such a checking method is, however, far too complicated and requires too much time.

It is an object of the present invention to provide a quick-change chuck of the type as mentioned above in which by installing a special spring, the ball-holding sleeve is slidable for a limited extent in the axial direction against the action of this spring between and along the spindle head and the control sleeve from a forward idling position to a rear working position when the tool is pressed against a workpiece. The front end of the ball-holding sleeve is for this purpose provided with a flange of a smaller diameter which contains the locking balls and has an inner shoulder which in the idling position is spaced from the end surface of the spindle head and abuts against this end when the ball-holding sleeve is moved toward the rear to the working position against the action of the spring. This axial movement of the ball-holding sleeve from one to the other position may be indicated by suitable means which may also control the operation of the machine so that the latter will be stopped, for example, if a drill breaks which is mounted in the collet of the chuck.

The present invention therefore accomplishes the object to attain a quick-change chuck which only requires a minor and inexpensive change of a chuck of the known type so as to operate automatically and very reliably to indicate the occurrence of irregularities in the machining operation and, if desired, then to stop the machine immediately.

The features and advantages of the present invention will become more clearly apparent from the following detailed description thereof which is to be read with reference to the accompanying drawings, in which.

Figure 1:
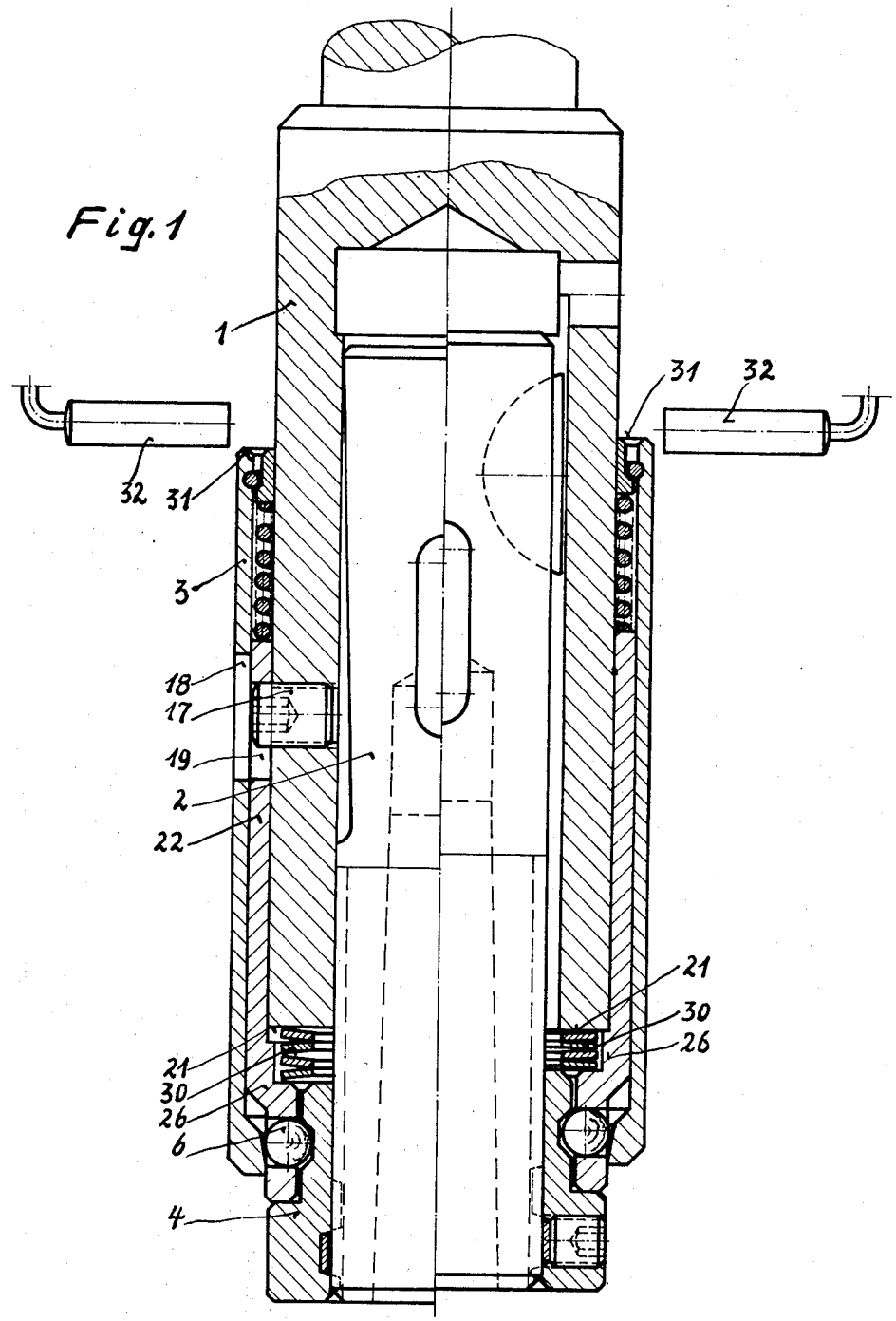
FIG. 1 shows a longitudinal section of a quick-change chuck according to one embodiment of the invention, in which the control sleeve is made of an increased length, and which illustrates the collet and ball-holding sleeve of this chuck at the left side of its longitudinal axis in the idling position and at the right side in the working position.
Figure 2:
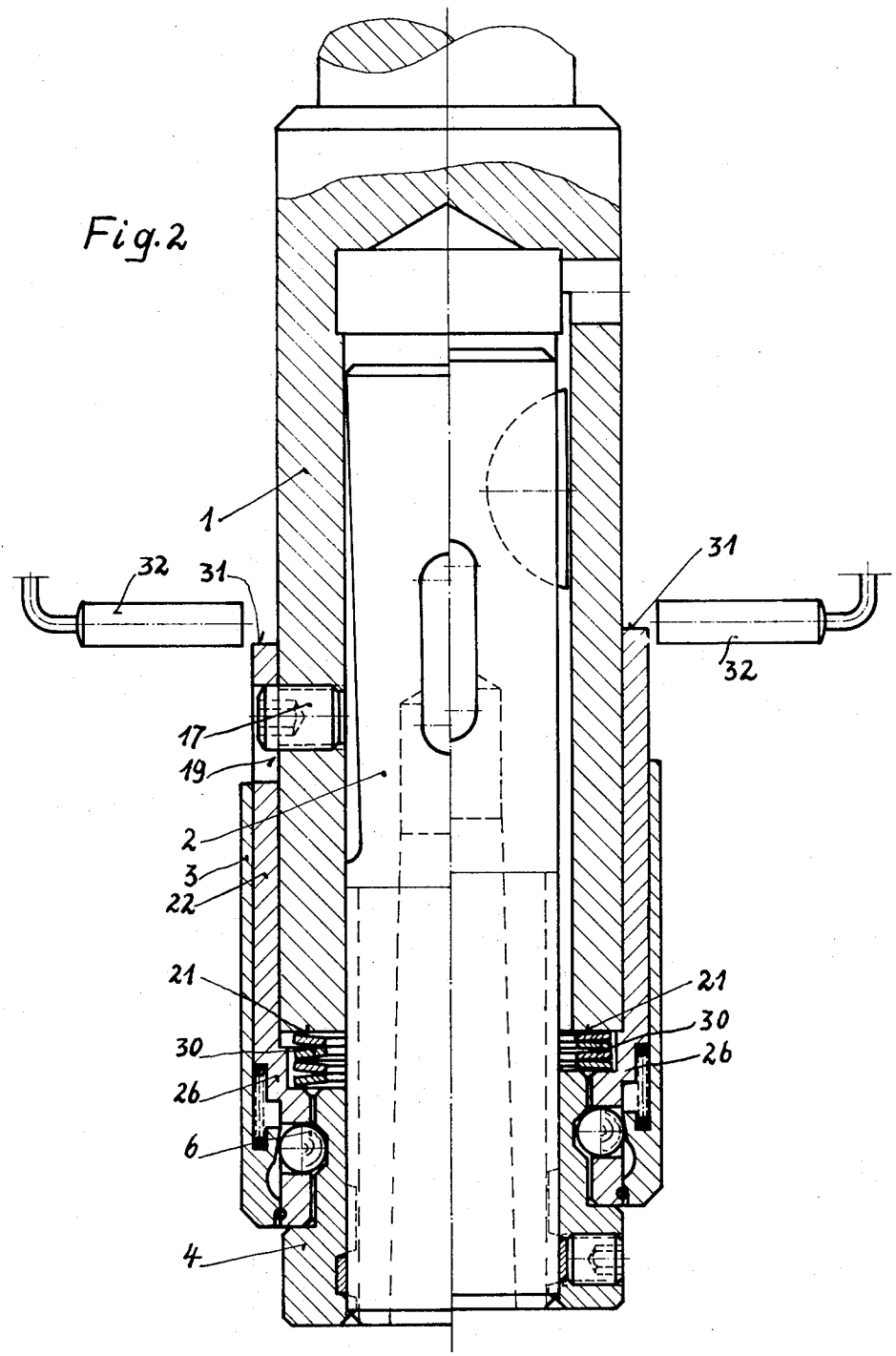
FIG. 2 shows a view similar to FIG. 1 of a quick-change chuck according to a modification of the invention in which the control sleeve has a shorter length and in which the collet and ball-holding sleeve are likewise illustrated at the left side in the idling position and at the right side in the working position.
Figure 3:
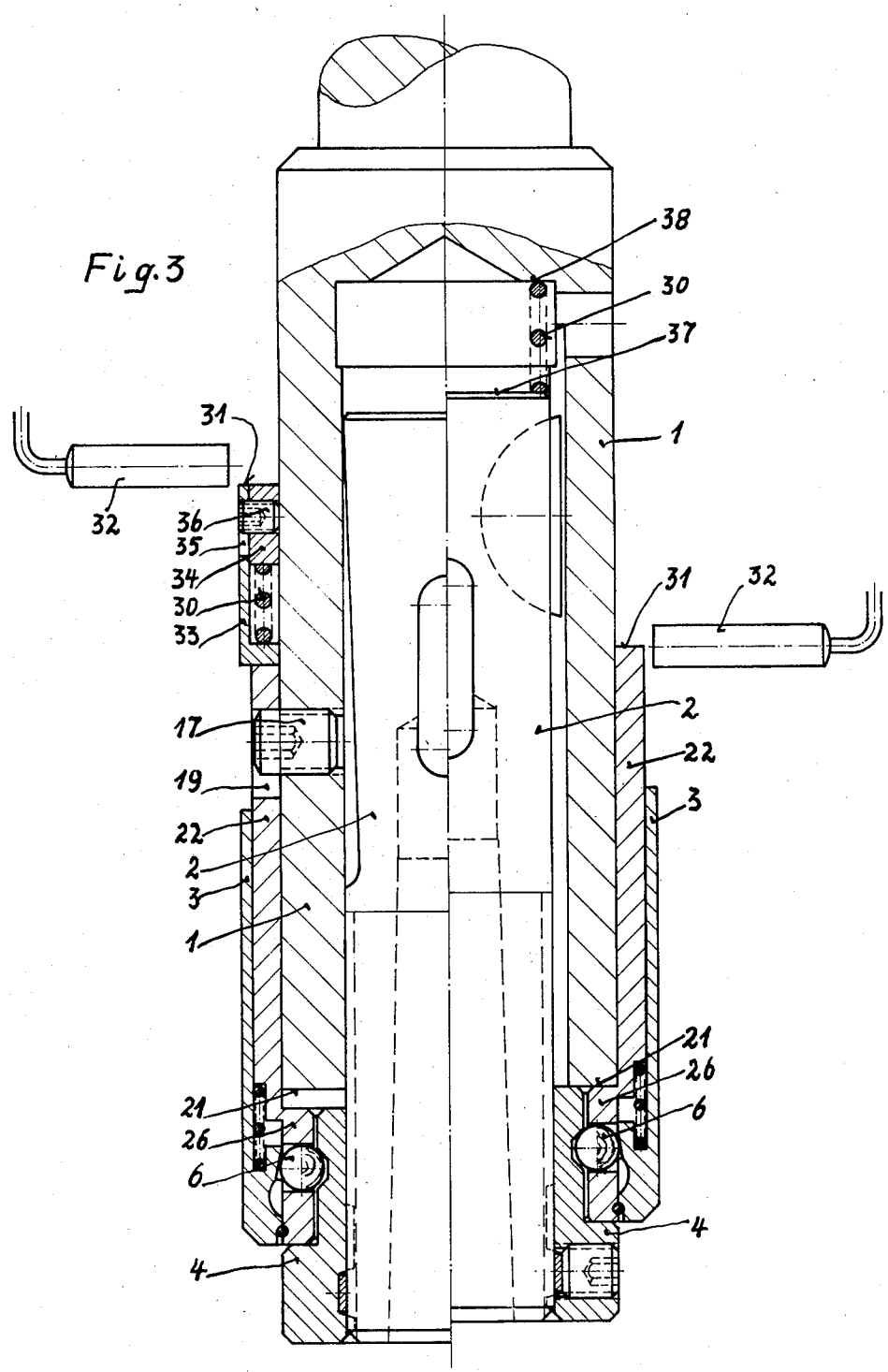
Figure 4:
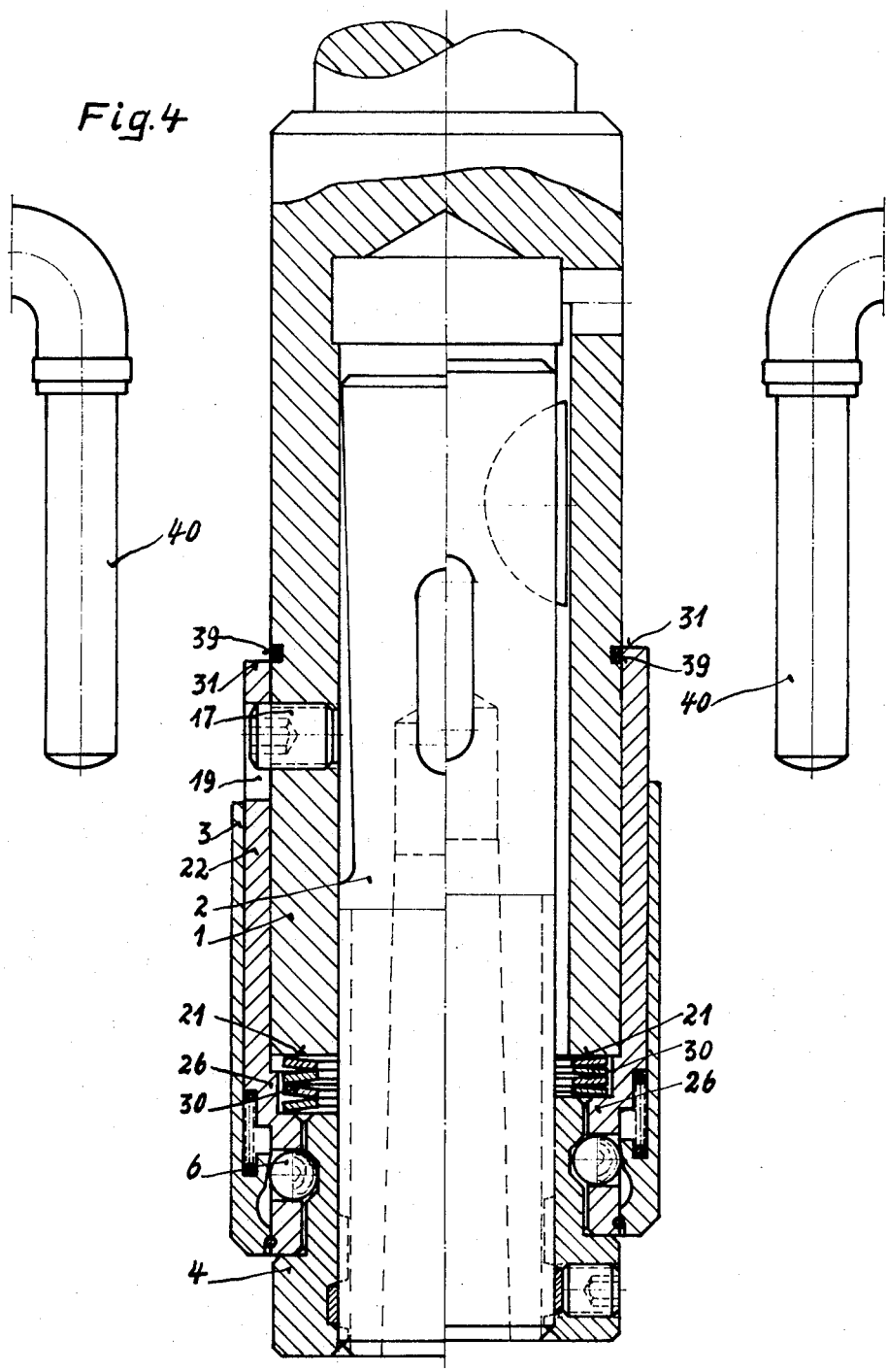

FIG. 3 shows a view similar to FIGS. 1 and 2 of a quick-change chuck according to two further modifications of the invention, one being shown at the left side of the longitudinal axis in the idling position of the collet, and the other modification at the right side in the working position; while FIG. 4 shows a longitudinal section of a quick-change chuck which is similar to that as shown in FIG. 3, but provided with a counter tube for indicating the two positions.

Referring first particularly to FIG. 1 of the drawings, the quick-change chuck as illustrated is generally of a known type which comprises a tool-holding collet 2 which is inserted into the spindle head 1 so as to be nonrotatable relative thereto, and the front end of which is provided with a nut 4. Over the front part of spindle head 1 a ball-holding sleeve 22 is fitted the front end of which forms an annular flange 26 of a smaller diameter which has an inner shoulder which is adapted to abut against the end surface 21 of the spindle head 1. This flange is further provided with radial bores in which the usual locking balls 6 are movable partly into or out of an annular groove in nut 4, depending upon whether the outer control sleeve 3 is shifted toward the rear or forwardly. The spindle head 1 has a tapped radial bore into which a setscrew 17 is screwed which is inserted through a longitudinal hole 18 in the control sleeve 3 and through a bore in the ball-holding sleeve 22 along which the control sleeve is slidable.

The quick-change chuck according to the invention differs from the chuck as above described by the provision of an annular recess in the flange 26 of the ball-holding sleeve 22, by the insertion of a spring 30 into this recess between its bottom and the end surface 21 of spindle head 1. This spring 30 is preferably provided in the form of a set of cup springs because of the small space which such a set of springs requires. Furthermore, both of the apertures in the control sleeve 3 and in the ball-holding sleeve 22 are provided with elongated holes 18 and 19 through which the setscrew 17 is screwed into the spindle head 1. By means of spring 30, sleeve 22 will therefore normally be pushed forwardly until the rear end of the elongated hole 19 abuts against the setscrew 17. This movement will also be transmitted by the locking balls 6 to the nut 4 and thus also to the collet 2 and the tool which is mounted therein. This position, the so-called idling position of the ball-holding sleeve 22, nut 4 and collet 2, is illustrated in FIG. 1 at the left side of the longitudinal axis of the entire chuck.

These elements will remain in this idling position as long as the machine is stopped or runs idle. However, as soon as the tool projecting from collet 2 encounters a resistance and starts to cut into a workpiece, sleeve 22 will be shifted toward the rear against the action of spring 30 until an inner rear shoulder between flange 26 and the main part of sleeve 22 abuts against the front end of spindle head 1. The mentioned elements 22, 4 and 2 are then in their working position, as illustrated at the right side of FIG. 1. The front end 21 of spindle head 1 then abuts tightly against the rear shoulder in the ball-holding sleeve 22 and the forward movement of spindle head 1 is thus positively transmitted to the tool in collet 2.

In the event that the tool breaks or the spindle head 1 is retracted so that no further axial pressure is exerted upon the spindle head, spring 30 will shift the ball-holding sleeve 22 together with nut 4 and the collet 2 back to the idling position, as shown at the left side of FIG. 1.

The two positions of collet 2, nut 4 and the ball-holding sleeve 22 as well as the control sleeve 3 on the latter may be indicated by a separate indicating instrument which is mounted on the spindle or the spindle head 1 by suitable means, not shown, so as to be spaced at a small distance from the outer surface of the rear end 31 of the control sleeve 3 when the latter is moved to the rear position. This instrument consists of an electronic switch 32 which extends at a right angle to the outer surface of spindle head 1 and responds immediately as soon as the rear end of control sleeve 3 moves in front of its end surface. Thus, when the collet 2 is in its left or idling position, no indication will occur, while when collet 2 is moved to its working position as shown at the right side of FIG. 1, the rear end 31 of control sleeve 3 projects in front of the end surface of the electronic switch 32 so that the latter is actuated.

If therefore, when machining a workpiece, for example, by means of a multiple-spindle drilling machine, a drill is missing or broken off in any spindle, the circuit 4 of the electronic switch 32 which is associated with this spindle will be or remain interrupted, and since the switches 32 of all spindles of the machine are connected in series, the entire circuit will be interrupted and the machine will be stopped. Switches of this type preferably consist of an oscillator which is operative at a high frequency which varies when a metal part moves into its vicinity and thereby affects the output transistor accordingly. Such switches are employed especially for controlling and supervising the operations of various machines or machining elements without coming in direct contact therewith, and in connection with suitable spring elements they may also be employed with other types of chucks, collets or the like.

The quick-change chuck as illustrated in FIG. 2 is similar to the chuck as shown in FIG. 1, except that the control sleeve 3 is made of a shorter length and the electronic switch 32 will be acted upon by the rear end of the ball-holding sleeve 3 when spring 30 is compressed between the inner front shoulder of flange 26 and the front end of spindle head 1 to such an extent that the rear shoulder abuts against this front end 21 of spindle head 1.

Instead of mounting the spring 30 between the front end of spindle head 1 and the inner front shoulder of flange 26, it is also possible as illustrated at the left side of FIG. 3 to insert the spring 30 together with a ring 34 into a sleeve 33 and to slip the latter together with spring 30 and ring 34 over the spindle head 1. After this ring 34 has been secured to the spindle head 1 by means of a setscrew 36, sleeve 33 is slidable along the spindle head 1 against the action of spring 30 from the idling position to the working position since the front end of sleeve 33 abuts against the rear end of the ball-holding sleeve 22. In the idling position, the inner shoulder on flange 26 is spaced from the front end 21 of spindle head 1, as shown at the left side of FIG. 3, while in the working position, not shown, the pressure of the tool against a workpiece will move sleeve 22 against the action of spring 30 toward the rear until the shoulder in flange 26 abuts against the front end 21 of spindle head 1 and the rear end 31 of sleeve 33 is thereby moved directly in front of the free end of the electronic switch 32 so that the latter will be actuated and effect an indication of this position or a control operation as previously described.

The right side of FIG. 3 illustrates another modification of the invention, in which the spring 30 is inserted into the spindle head 1 so that its opposite ends engage upon the bottom 38 of the longitudinal bore of the spindle head and upon the rear end surface of the collet 2. Except for the fact that spring 30 acts in this case directly upon the collet 2, this quick-change clutch operates in the same manner as the clutches which have been previously described.

Since an electronic switch 32 has a considerable length in a radial direction to the spindle head with which it is associated and since such a switch must be mounted on the spindle or the spindle head in such a position that its free end will be closely adjacent to the metal part affecting it, for example, to the control sleeve 3 or the ball-holding sleeve 22 since otherwise the switch would not be reliably actuated, it may occur in a multiple-spindle machine that the space available between the adjacent spindles might be too small for providing an electronic switch 32 for each spindle. In such a machine or whenever the available space adjacent to a spindle head 1 is too cramped for mounting an electronic switch 32 on the spindle or spindle head, it is advisable to employ a different type of indicating instrument, for example, a counter tube, which will operate reliably regardless of whether it is mounted closely adjacent to or at a considerable distance from the spindle head with which it is associated. Such instrument other than an electronic switch also has the advantage that it does not have to be connected to the spindle or spindle head so as to be movable therewith.

The use of such a counter tube 40 in place of an electronic switch 32 is illustrated in FIG. 4. For acting upon such a counter tube 40, an indicating ring or radiating ring 39 is inserted into an annular groove which is provided in such a position in the outer peripheral surface of spindle head 1 that, when sleeve 22 is in its forward idling position, as shown at the left side of FIG. 4, this indicating or radiating ring 39 will be exposed, while when sleeve 22 is in its rear working position as shown at the right side of FIG. 4, ring 39 will be covered by sleeve 22. When the radiating ring 39 is exposed, its rays will hit upon the counter tube 40 and an instrument which is connected thereto will then indicate that sleeve 22 and thus also the collet 2 and the tool thereon is in the idling position. Spring 30 may in this case be mounted in any of the positions as described with reference to FIGS. 1 to 3.

Of course, the radiating ring 39 may also be mounted in such a manner that it will be covered when sleeve 22 is in the idling position, while in the working position of sleeve 22 this ring 39 will be visible, for example, through a window in sleeve 22 which would then be made of a greater length. In place of a radiating ring it is also possible to insert a reflecting ring or the like into the annular groove in spindle head 1. In such a case, the counter tube or indicating tube will receive reflected rays and cause the operation of the machine to be controlled in accordance with the indicated position of sleeve 22.

Although our invention has been illustrated and described with reference to the preferred embodiments thereof, we wish to have it understood that it is in no way limited to the details of such embodiments but is capable of numerous modifications within the scope of the appended claims.

We claim:

1. In a quick-change chuck comprising a spindle head having an axial bore, a collet for holding a tool adapted to be inserted into said bore so as to be non-rotatable relative to said spindle head, a nut screwed upon the front end of said collet, said nut having a rear part of a smaller diameter with a rear end surface facing the front end surface of said spindle head, said rear part of said nut having a peripherial groove the lateral flanks of which taper toward the bottom of said groove, a ball-holding sleeve axially slidable along the outer surface of said spindle head, said ball-holding sleeve having on its front end an annular flange of a smaller diameter and an inner shoulder facing the end surface of said spindle head, an outer control sleeve slidable in its axial direction along the outer surface of said ball-holding sleeve, said flange having radial bores, locking balls slidable in said bores and partly engaging into said peripheral groove under the pressure of said control sleeve when the latter is shifted in one axial direction, said locking balls disengaging from said groove when said control sleeve is shifted in the other axial direction, means for limiting the displacement of said ball-holding sleeve, and spring means for maintaining said ball-holding sleeve, said collet and said nut in an idling position when said spindle head is stopped or runs idle, said limiting means being axially spaced from said end surface of said spindle head in said idling position, said ball-holding sleeve, said collet and said nut being displaced from said idling position to a working position when a tool mounted in said collet presses axially against a workpiece, said limiting means abutting against said end surface of said spindle head in said working position.

2. A quick-change chuck as defined in claim 1, in which at least one of said ball-holding and control sleeves is provided with an elongated hole extending in the axial direction of said sleeve, said spindle head having a tapped radial bore, a setscrew screwed into said bore and its outer end extending into and slidable along said elongated hole, the rear end of said hole forming a stop for limiting the distance to which said inner shoulder may be moved to said idling position by said spring means away from the end surface of said spindle head.

3. A quick-change chuck as defined in claim 2, in which said limiting means is a second inner shoulder forwardly of said first shoulder, said spring means being inserted into the space between said first shoulder and said end surface of said spindle head.

4. A quick-change chuck as defined in claim 2, in which said spring means are inserted between the rear end of said collet and the bottom of said axial bore in said spindle head into which said collet is inserted.

5. A quick-change chuck as defined in claim 2, further comprising an additional sleeve axially slidable on said spindle head, and extending said ball-holding sleeve toward the rear, said spring means disposed within said additional sleeve and the front end thereof pressing the front of said additional sleeve into engagement with the rear end of said ball-holding sleeve, and means for connecting the rear end of said additional sleeve to said spindle head.

6. A quick-change chuck as defined in claim 2, further comprising means spaced from said spindle head for sensing one of said idling or said working position of said spindle head.

7. A quick-change chuck as defined in claim 6, in which said sensing means comprises an electronic switch connected to and movable at least in the axial direction with said spindle head, said electronic switch extending substantially at a right angle to said spindle head with the free end thereof located at a small distance in the radial direction from said spindle head so as to form an intervening space whereby when said ball-holding sleeve is moved from said idling position to said working position against the action of said spring means, the rear end of at least one of said sleeves passes into said space so that said switch will be actuated.

8. A quick-change chuck as defined in claim 6, in which said sensing means comprises a means for sending and receiving rays.

9. A quick-change chuck as defined in claim 8, in which said spindle head has a peripheral groove in its outer surface, and further comprising a radiating ring inserted into said groove, said ring being covered by the rear end of said ball-holding sleeve when in said working position and exposed toward said sensing means when in said idling position whereby in said idling position the rays emanating from said ring will impinge upon said sensing means to effect a control operation.

10. A quick-change chuck as defined in claim 6, in which said sensing means includes means for sending and receiving rays, said spindle head having a peripheral groove in its outer surface, and further comprising a reflecting ring inserted into said groove and covered by the rear end of said ball-holding sleeve when in said working position and exposed to said sensing means when in said idling position so that in said idling position the rays emanating from said sensing means will be reflected by said ring to said sensing means to effect a control operation.

* * * * *